United States Patent [19]
Cordova

[11] 3,823,519
[45] July 16, 1974

[54] AIRCRAFT HANGER

[76] Inventor: Elmer Cordova, 5805 S. Santa Fe Dr., Denver, Colo. 80120

[22] Filed: July 27, 1972

[21] Appl. No.: 275,461

[52] U.S. Cl............................ 52/65, 52/73, 52/169
[51] Int. Cl............................................. E04b 1/346
[58] Field of Search............ 52/64, 65, 143, 79, 73, 52/169

[56] References Cited
UNITED STATES PATENTS

| 2,595,794 | 5/1952 | Keller | 52/65 |
| 3,166,870 | 1/1965 | Porte | 52/143 |
| 3,234,695 | 2/1966 | Johnson | 52/64 |
| 3,258,886 | 7/1966 | Button | 52/64 |
| 3,708,200 | 1/1973 | Richards | 52/64 |

FOREIGN PATENTS OR APPLICATIONS

| 75,219 | 1/1919 | Austria | 52/64 |
| 702,071 | 1/1954 | Great Britain | 52/65 |
| 185,966 | 6/1956 | Austria | 52/65 |
| 1,018,050 | 9/1952 | France | 52/79 |
| 1,398,494 | 3/1965 | France | 52/65 |
| 283,651 | 4/1915 | Germany | 52/65 |

Primary Examiner—Henry C. Sutherland
Assistant Examiner—Henry Raduazo
Attorney, Agent, or Firm—Richard D. Law

[57] ABSTRACT

A light weight individual hanger for an aircraft includes two mirror image, symmetrical cover sections made of a light weight framework covered by an outer covering pivotally mounted at the rear about a vertical axis to swing from a closed aircraft covering and to an open aircraft release position. A lift jack at the vertical axis raises the cover sections to the extent necessary for the aircraft to be wheeled forwardly. Support legs depend from each wing cover portion to support the cover sections above the aircraft.

4 Claims, 5 Drawing Figures

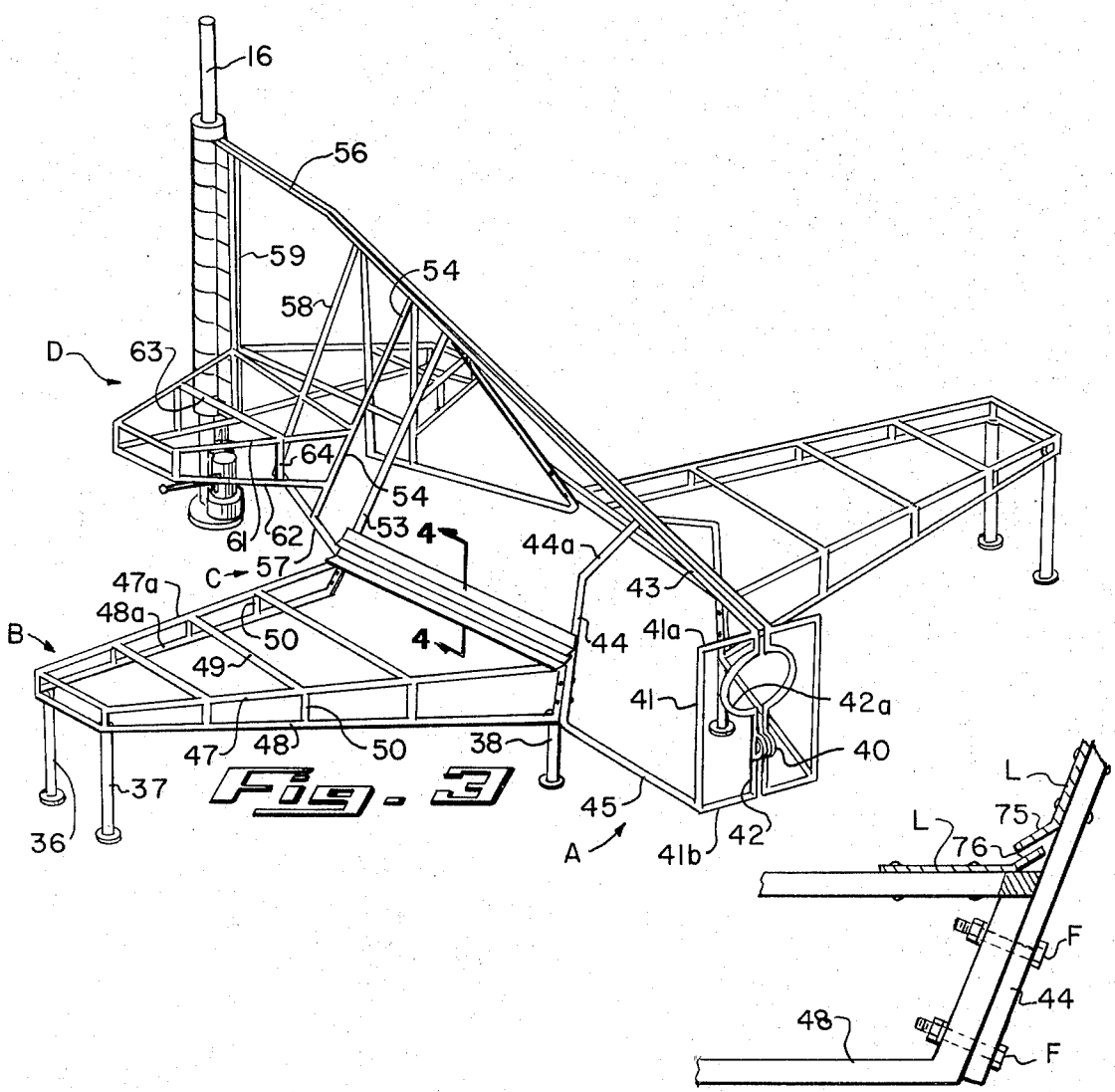
Fig. 3
Fig. 4
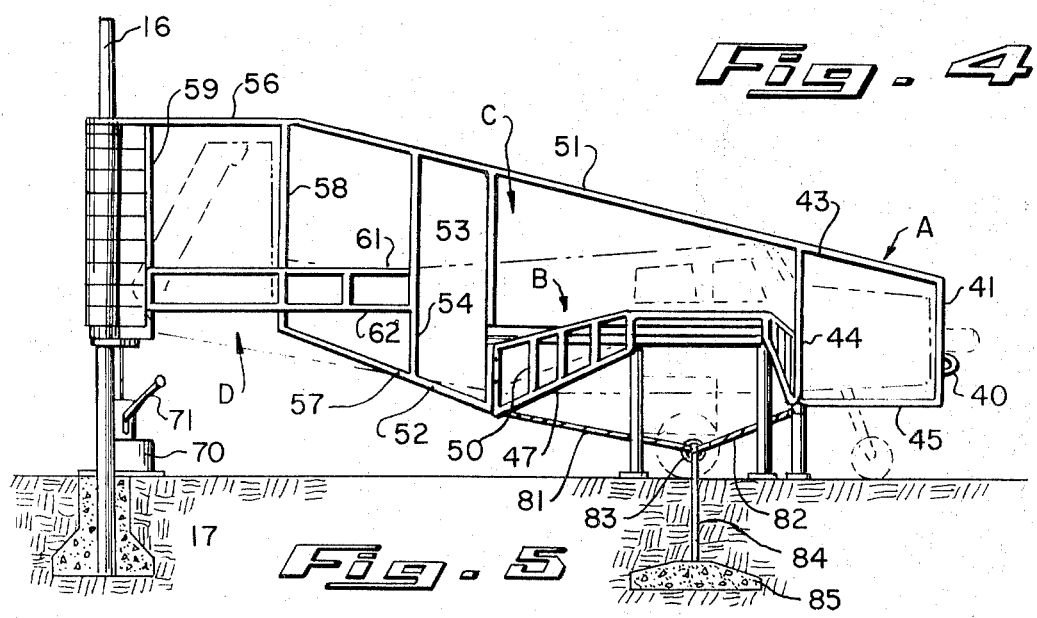
Fig. 5

AIRCRAFT HANGER

This invention relates generally to aircraft hangers and more particularly to an individual, self-supporting, lightweight hanger for fixed wing aircraft and the like.

Relatively small, fixed wing aircraft require some form of shelter to protect them against weather damage, wind damage and pilferage. In many instances, the cost of conventional hanger is excessive or such a hanger is not conveniently available. Some attempt has been made to provide individual hangers by providing a framework in the form of a stationary wing covering portion and a rear fuselage tail covering portion which pivots about a horizontal axis to uncover the rear portion of the airplane and rearwardly of the wings thereby permitting it to be wheeled away from the device. Other prior individual hangers generally have taken the form of conventional buildings or frameworks which require a substantial span for the wings to clear and an opening sufficient to allow the plane to be removed therefrom.

Accordingly, it is an object of this invention to provide a simple, durable and highly reliable individual hanger for a fixed wing aircraft.

Another object of this invention is to provide a novel individual hanger for an aircraft which is readily manipulated to receive and release a fixed wing aircraft.

Another object of this invention is to provide a novel individual aircraft hanger characterized by two mirror image cover sections pivoted at the rear ends thereof and raised as a cantilever at the rear ends to allow the aircraft to be wheeled therefrom when the front ends are open and spaced apart a limited distance.

It is a further object of this invention to provide a novel aircraft hanger which can be conveniently locked and unlocked and is readily opened and closed.

Still a further object of this invention is to provide a novel and improved individual aircraft hanger characterized by having two symmetrical cover sections made up of lightweight structural members interconnected in a framework which is covered by an outer covering, the cover sections fitting down over the top of the aircraft and are pivotally mounted at the rear ends to pivot about a vertical axis and spread apart at the front end when the sections are raised to permit the aircraft to be wheeled therefrom.

In accordance with the present invention, in a preferred form shown, there is provided two symmetrical cover sections which when in adjacent position include a nose cover portion, a body cover portion, wing cover portions and tail cover portions. The unit is made of structural members connected in a lightweight unitary framework covered on the upwardly exposed surfaces by an outer covering. The cover sections are hinged at their rear ends and are raisable so as to cantilever from an upright axis to swing lengthwise between a closed position covering the aircraft and an open position in which the cover sections are separated a limited distance at the front end. A lock at the front end prevents separation of the cover sections and removal of the aircraft. A lift jack raises the rear hinge to elevate the cover sections to the extent necessary for the aircraft to be wheeled forwardly through a front opening between the cover section in the open position. A pair of outer legs and a retractable inner leg depend from the outer ends and inner ends, respectively, of the wing cover portion to support the cover sections above the aircraft.

Other objects, advantages, and capabilities of the present invention will become more apparent as the description proceeds taken in conjunction with the accompanying drawings in which:

FIG. 3 is a perspective view of the hanger with the covering layer removed to show the interior framework construction;

FIG. 4 is an enlarged detail, sectional view taken along lines 4—4 of FIG. 3;

FIG. 5 is a side elevational view of the framework with an aircraft shown in dashed lines and covered thereby.

Figure 1:
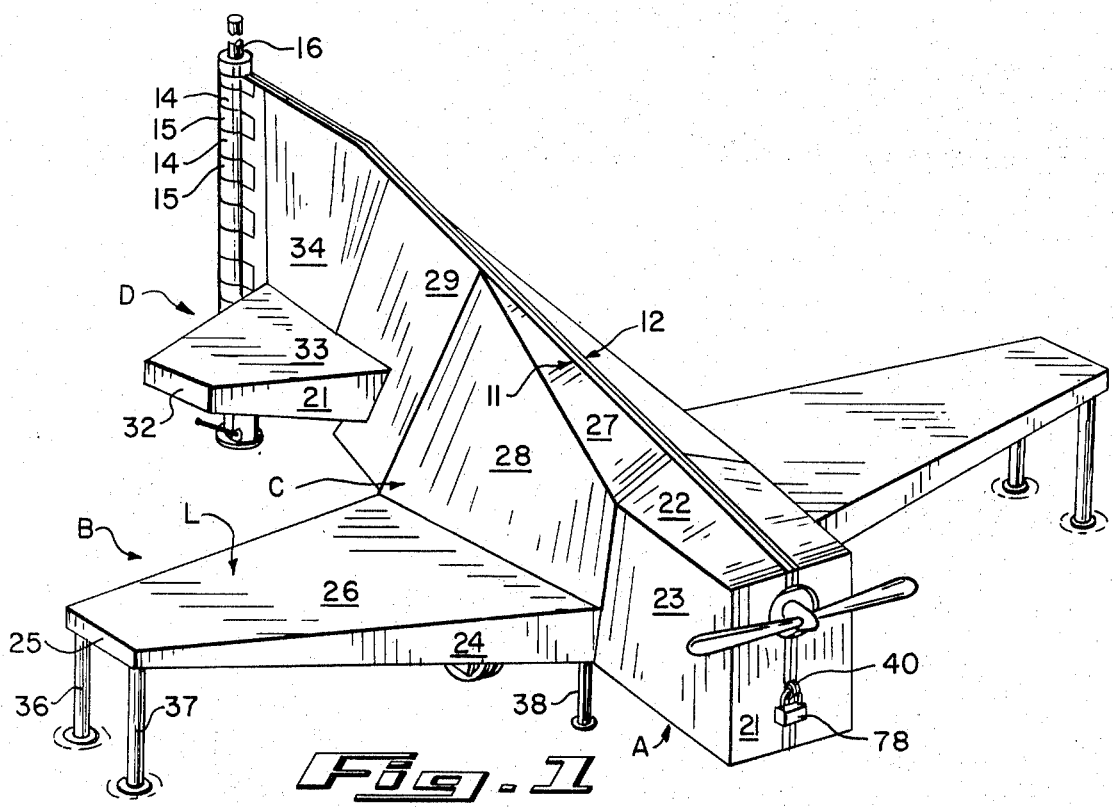
FIG. 1 is a perspective view of a hanger with the cover sections disposed in a closed position.

Referring now to the drawings, the aircraft hanger shown comprises two, symmetrical, mirror image cover sections, shown in general by numerals 11 and 12, which are of a corresponding size and shape on opposite sides of a vertical plane i.e., mirror image halves, so that a description of one cover section applies to the other cover section.

Each cover section comprises a nose cover portion A, a wing cover portion B, a body or fuselage cover portion C, and an empennage or tail assembly cover portion D interconnected together as a unit with the rear ends thereof being attached to a hinge assembly including a plurality of hinge sections 14 connected to cover section 11, and a plurality of hinge sections 15 alternating with hinge sections 14 connected to cover section 12. The hinge sections have a circular, transverse cross-section and are hollow to fit on and rotate relative to an upright support post 16, which is anchored in a concrete foot 17 submerged below the ground surface, in such a way that the cover sections will swing lengthwise about a vertical axis at the rear thereof and spread apart at the front end between a closed position as shown in FIG. 1 and an open position shown in FIG. 2.

Briefly, each of the cover sections is made up of a framework of lightweight structural members interconnected as a unit and covered by a sheet or skin material L covering such as weather resistant sheet metal, fiberglass, or the like, which is resistant to moisture, hail, and the like.

Figure 2:
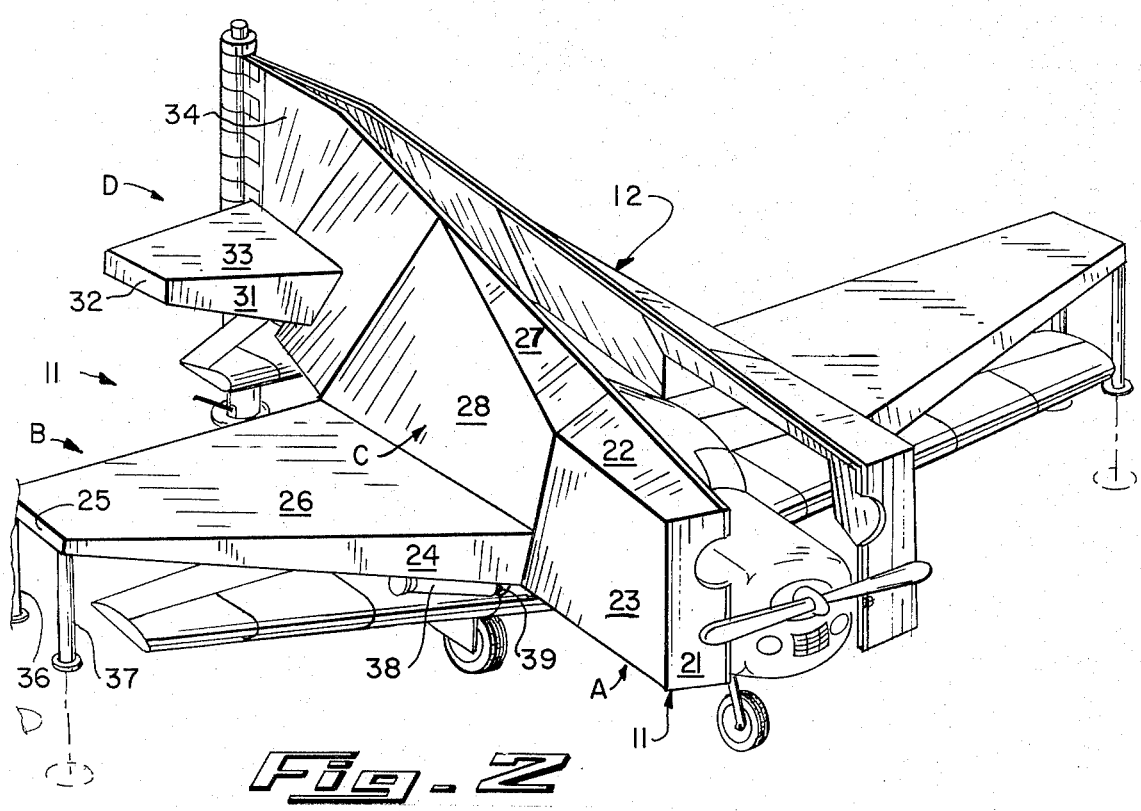
FIG. 2 is a perspective view of the hanger shown in FIG. 1 with the cover sections in a partially open position.

Referring now to FIGS. 1 and 2, the covering or layers L on the framework form a plurality of distinct sections. The covering on the nose portion A has a front section 21, a side section 23 and a top section 22. In turn, the wing cover portion B has forward and rear edge sections 24, an outer tip section 25 and a top cover section 26. The body cover portion C has a top section 27, a side section 28 in line with the wings and another side section 29 rearwardly of the wings. The tail assembly has front and rear edge sections 31, an outer end section 32, a top cover section 33 and a vertical tail assembly cover side section 34.

The wing cover portion B has a pair of outer legs 36 and 37 depending from the tip corners thereof which are fixedly secured thereto. These support the wing cover portion B above the wing of the aircraft together with an inner retractable leg 38 depending from the inner end of the wing cover portion C and pivotally fastened at pivot 39, the forward inner corner, to support the cover section above the aircraft. The inner leg 38 swings laterally outwardly and upwardly to a secured position. The leg 38 is suitably releasably fastened in upright position along the underside of the wing cover portion B prior to the raising of the cover. A pair of opposed clevis portions 40 are mounted on the inside of the front of nose section 21 to facilitate the locking of the cover sections together and prevent removal of the airplane therefrom.

Referring now to FIGS. 3, 4 and 5, a framework, used for supporting the above cover sections and particularly the nose portion A, includes a front outer side member 41 with an inturned top portion 41a and inturned bottom portion 41b connected to an inner side member 42 having an outwardly concave semicircular portion 42a arranged to fit around the propellor of the aircraft together with a top member 43 and a rear side member 44 with an inturned upwardly inclined portion 44a and a bottom member 45 leaving the bottom open to fit down over the nose of the aircraft.

The wing cover portion B has a framework which includes upper and lower span members 47 and 48 at the front and members 47a and 48a at the rear. The upper span members are connected by upper cross-members 49 in spaced relation to one another and to forward and rear cross-brace members 50 in spaced relation to one another which extend down from the upper cross-members. There is an open rectangular frame work formed at the wing tip. The innermost of cross-members 49 and 50 form an inverted U-shape section which is fastened to the body cover portion C by bolts F or the like whereby the wing cover portion B is cantilevered from the body portion C.

The body cover portion C has a top member 51 forming a straight continuation of member 43 and a rearwardly and upwardly extending bottom member 52 together with a pair of spaced apart, laterally inclined side members 53 and 54.

The tail assembly cover portion B has a framework including a top member 56 forming a continuation of member 51, a bottom member 57, an intermediate member 58, and a rear member 59 together with upper and lower span members 61 and 62 at the front and rear, the upper span members being connected by upper cross member 63 and forward and rear cross-members 64. The outermost span cross-members are connected in an open rectangular framework at the tail tips of the aircraft. The inner ends of the upper and lower span members are connected to the side members 54 and 59.

A lift type jack 70, preferably hydraulic, is provided at the rear of the aircraft cover under the hinge collar assembly and thereby lift the cover upon the stroking of a lever 71. The jack 70 elevates the cover until the bottom of the cover sections clear the aircraft.

Referring now to FIG. 4, the joint at the wing cover portion B is shown to include an outer covering layer on the frame member 44 with a downwardly and outwardly overhanging section 75 and cover layer on frame member 47 with an inwardly and upwardly inclined section 76 which underlays the upper section 75 to provide a seal against weather or water leakage at the wing joint.

A tie-down arrangement anchors the cover to the ground which includes a cable 81 attached to the rear inner end of the wing cover portion and a cable 82 attached to the forward inner end of the wing cover portion B. The lines are connected to a common ring 83 which also has a vertical cable 84 anchored to a concrete footing 85 (or other ground anchor) below the ground surface.

OPERATION

In the closed position shown in FIG. 1, the front end of the cover sections are together with the opposed top frame members and front frame members abutting against one another and a lock 78 is secured to the opposed clevis members 40 with the depending legs 36, 37 and 38 supporting the forward end of the cover sections above the top of the aircraft. In this way the plane is fully protected against the elements, as shown in FIG. 5. When it is desired to remove the airplane the lock 78 is removed from the clevis members 40 and the tie-down assembly released. The inner legs 38 are moved up to the retracted position, and the jack is actuated to elevate the cover sections. The cover sections are then spread apart lengthwise about the vertical rear axis and the aircraft is wheeled forwardly out of the cover section. Conversely when it is desired to cover the aircraft, the aircraft is wheeled back under the cover sections, the sections are brought together and then lowered so that the cover sections fully cover the aircraft.

Each type and size of aircraft generally requires a cover of a shape to fit. Thus, each cover is generally usable for specific aircraft. It is intended that the cover is easily modified to fit any type of aircraft. The cover, however, secures the aircraft from theft, entry and pilferage of valuable instruments and radios. The arrangement makes a secure covering for the aircraft from high winds, moisture, hail, snow, etc.

What is claimed is:

1. A hanger for protecting an aircraft comprising:
   a. two mirror image, symmetrical cover sections, each of said cover sections being shaped to about one-half of the top contour of a particular type of aircraft over which it is to be used providing a close fitting cover for such an aircraft and leaving the bottom portion of each cover section open,
   b. each of said cover sections including a nose cover portion, a body cover portion, a wing cover portion and a tail assembly cover portion, said cover sections being constructed of a framework made of structural members having an outer covering arranged over the top portion of said framework,
   c. pivotal means arranged adjacent the tail end of the interface of said covers and adapted to support said covers in a cantilever arrangement in an elevated position, spacing each said cover section above the upper surface of said aircraft,
   d. said pivotal means further including a lifting means for elevating said cover sections a sufficient distance to clear said aircraft, whereby the cover sections may be pivotally moved in opposite transverse directions from its down closed position covering said aircraft to its upper position permitting opening of said covers and the removal of said aircraft,
   e. tie down means arranged for securing said cover sections to anchor means provided on the ground surface for preventing the closed cover sections from moving while the aircraft is stored therein, and f. each of said cover sections including a plurality of support legs at the outer end of the wing cover portion and a retractable support leg at the inner end of the wing cover portion for assisting in support of the cover sections when said cover sections are in the closed position.

2. A hanger as defined in claim 1, wherein:

said pivotal means includes an upright self-supported hinge rod anchored at its base and a hinge assembly having a hinge portion fixedly attached to each of the ends of said cover sections adjacent to said pivotal means, and each of said hinge portions having a plurality of spaced and aligned hinge sections, said hinge sections being arranged to alternate on said hinge rod to form a pivotal connection for said cover sections.

3. A hanger as described in claim 1, wherein:

said cover sections include locking means at the end of the interface opposite from said pivotal means whereby the cover sections may be secured together while in the closed position.

4. A hanger as defined in claim 1, wherein:

said lifting means includes hydraulic jack means having a manually operated hydraulic pump and a hydraulic cylinder for elevating said cover sections.

* * * * *